United States Patent
Gair, Jr. et al.

(10) Patent No.: US 9,471,235 B1
(45) Date of Patent: Oct. 18, 2016

(54) STORAGE DEVICE DATA OVERLAY TRACKING AND PREVENTION

(71) Applicant: International Business Machines Corporation, Armonk, NY (US)

(72) Inventors: Thomas J. Gair, Jr., Cedar Park, TX (US); Miguel A. Perez, Miami, FL (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/983,789

(22) Filed: Dec. 30, 2015

Related U.S. Application Data (63) Continuation of application No. 14/721,099, filed on May 26, 2015.

(51) Int. Cl.
| | | |
|---|---|---|
| *G06F 12/00* | (2006.01) | |
| *G06F 3/06* | (2006.01) | |
| *G06F 13/16* | (2006.01) | |
| *G06F 13/42* | (2006.01) | |
| G06F 13/28 | (2006.01) | |
| G06F 12/14 | (2006.01) | |

(52) U.S. Cl.
CPC ............ *G06F 3/0619* (2013.01); *G06F 3/067* (2013.01); *G06F 3/0653* (2013.01); *G06F 3/0683* (2013.01); *G06F 13/16* (2013.01); *G06F 13/42* (2013.01); *G06F 12/14* (2013.01); *G06F 12/1458* (2013.01)

(58) Field of Classification Search
CPC ........................ G06F 12/14; G06F 12/1458
See application file for complete search history.

(56) References Cited

U.S. PATENT DOCUMENTS

| | | | |
|---|---|---|---|
| 4,939,598 A | | 7/1990 | Kulakowski et al. |
| 6,047,353 A | * | 4/2000 | Vishlitzky ............ G06F 11/3495 711/111 |
| 8,782,014 B2 | | 7/2014 | Shepard et al. |
| 8,782,360 B2 | | 7/2014 | Cammarata et al. |
| 2007/0028067 A1 | | 2/2007 | Hinrichs et al. |
| 2007/0079061 A1 | * | 4/2007 | Ogasawara ............... G06F 9/52 711/112 |
| 2009/0094676 A1 | * | 4/2009 | Burugula ............... G06F 21/554 726/2 |
| 2012/0159006 A1 | | 6/2012 | Johnson et al. |
| 2013/0346711 A1 | | 12/2013 | Beeken et al. |

OTHER PUBLICATIONS

List of IBM Patents or Patent Applications Treated as Related, signed Feb. 15, 2016. 2 pgs.
Gair Jr., et al., "Storage Device Data Overlay Tracking and Prevention", U.S. Appl. No. 14/721,099, filed May 26, 2015.

* cited by examiner

*Primary Examiner* — Mark Giardino, Jr.
(74) *Attorney, Agent, or Firm* — Brian Welle; Robert Sullivan (57) ABSTRACT

Aspects of the disclosure are direct towards managing data overlay in a direct access storage device (DASD) using metadata of data stored within the DASD. The DASD receives user input. The user input includes a value indicating activation of overlay tracking for a track of the DASD. The DASD updates the metadata to indicate overlay tracking activation. The DASD detects a write request from an application to overlay data on the track. In response to overlay tracking being activated for the track, the DASD determines the access method used to transmit the write request. The DASD determines an identifier for the application. The DASD determines the identifier using the protocol of the access method. The DASD records data regarding the write request within the metadata. In response to recording the data regarding the write request, the DASD overlays the track per the write request.

1 Claim, 4 Drawing Sheets

STORAGE DEVICE DATA OVERLAY TRACKING AND PREVENTION

BACKGROUND

Interfacing between applications and direct access storage devices has become increasingly complex over time. Numerous programming functions can intercept and/or manipulate data on direct access storage devices at various points along the data pipeline. These interceptions and manipulations can execute without alerting an end user. When data changes incorrectly, end users may need to perform substantial data tracing to locate the source of the inaccuracy.

SUMMARY

Aspects of the disclosure are direct towards managing data overlay in a direct access storage device (DASD) using metadata of data stored within the DASD. The DASD may receive user input. The user input may include a value indicating activation of overlay tracking for a track of the DASD. The DASD may update the metadata to indicate overlay tracking activation. The DASD may detect a write request from an application to overlay the data on the track. The DASD may determine the access method used to transmit the write request. The access method may be determined in response to overlay tracking being activated for the track. The DASD may determine an identifier for the application. The DASD may determine the identifier using the protocol of the access method. The DASD may record data on the write request within the metadata. In response to recording the data on the write request, the DASD may overlay the track with the data of the write request.

In embodiments, the DASD may prevent data overlay. A track of the DASD may have overlay prevention activated. The DASD may detect a write request from an application for the track. The write request may include overlaying data on the track. The DASD may determine the access method used to transmit the write request. The access method may be determined in response to either overlay tracking being activated or overlay prevention being activated. The DASD may determine the identifier of the application using the protocol of the access method. The DASD may compare the identifier to a database of applications with permission to overlay the track. The DASD may determine the application to not have permission to overlay the data. In response to the application to lack permission, the DASD may intercept the write request.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for managing data overlay in a direct access storage device (DASD). The DASD may have metadata regarding the data stored in the DASD. The metadata may include an overlay tracking flag and an overlay interception flag. The flags may be activated for certain volumes of the DASD. When the DASD receives a write request for a volume within the DASD which has an activated overlay tracking flag, the DASD may determine the access method used to transmit the write request. Using the protocol associated with this access method, the DASD may determine an identifier for the application which originated the write request, and record this identifier in the metadata along with other information of the write request. When the volume further has an activated overlay interception flag, the DASD may determine if the application has permission to overlay data in the volume, and overlay/intercept the write request in response to the application being allowed/disallowed, respectively.

In instances, numerous applications and programming modules may manipulate data on storage devices. In such instances, an application may acquire access to and submit a data overlay for a storage device to which the application should not have access, and the storage device—lacking the ability to identify the originating application across the data pipeline—allows the unauthorized data overwrite. In other instances, applications and modules may intercept write requests to the data on storage devices, manipulating the request. When the data on the storage device is incorrect or unexpected, a user may desire knowing how the data was manipulated into its current incorrect or unexpected values. In order to discover how the data was manipulated, the user may need to complete extensive tracing (e.g., usage of generalized trace facility) to find out which application/program/module/vendor installation edited the data or the write request. Successfully tracing the manipulation of data may require notable time and resources. If a user only has access to a portion of relevant applications and the storage device, the user may lack the ability to successfully trace the manipulation of data to its source.

A DASD may keep metadata which relates to the data stored on the DASD. In certain embodiments, the metadata may be a volume table of contents (VTOC) of the DASD. The VTOC may describe attributes of datasets on the DASD such as the size (e.g., amount of bytes), location (e.g., a specific physical track/sector address), or name of datasets stored on the DASD. The DASD may use a VTOC when processing an incoming write request to ensure data integrity. Embodiments of the disclosure may alter the functioning of the DASD in regards to data overlay.

In embodiments, the changed functionality of the DASD may include the input/output (I/O) processes and the initialization processes of the DASD. The DASD may include a new function for managing data overlay which uses the VTOC and/or other metadata. The new function for managing overlay is herein referred to as "OVRLY" or the "OVRLY function". The DASD may store data for the OVRLY function in an OVRLY table (OT) within the VTOC. The DASD may receive input which specifies certain volumes of the DASD as selected for tracking data overlay. By only tracking data overlay for certain volumes of the DASD, the DASD may achieve performance benefits in comparison to tracking data overlay for all volumes of the DASD. After a volume is selected for overlay tracking, if the DASD receives a write request to overlay data for that volume, the OVRLY function may determine the identity of the application which originated the write request. The OVRLY function may then record this identity in the OT along with details of the write request (e.g., the location of the volume of the write request, the current datum the write request is overlaying, the new datum to overlay the current datum, etc.). In this way a user may have a record of data overlay to successfully trace the manipulation of data to its source, resulting in data integrity benefits.

In embodiments, the DASD may also receive input which specifies certain volumes as selected for data overlay prevention. The OVRLY function may prevent some data overlay for those volumes. By only preventing data overlay for certain volumes the DASD may achieve performance benefits in comparison to preventing data overlay for all volumes of the DASD. In this embodiment, if the DASD receives a write request to overlay data in one of the volumes selected for overlay prevention, the OVRLY function may determine the identity of the application which originated the write request. The OVRLY function may then compare this identity to a list of applications which has permission to write to the volume of the write request. If the application is in the list of allowed applications, the OVRLY function may allow the overlay. If the application is not in the list of allowed applications, the OVRLY function may intercept the write request to prevent the data overlay. By preventing data overlay on an application level within the DASD, the OVRLY function may result in data integrity benefits.

Figure 1:
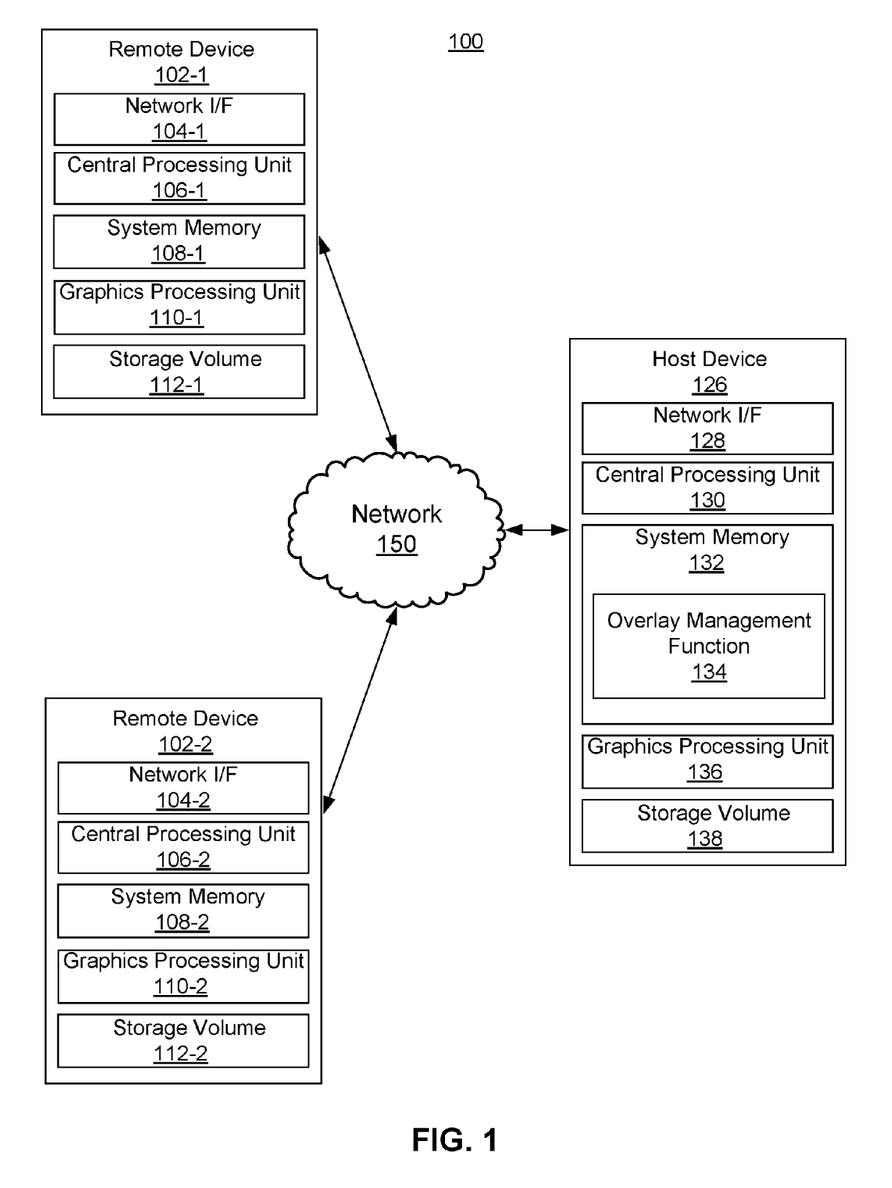
FIG. 1 is a system for managing overlay functionality, according to embodiments.

Turning now to the figures, FIG. 1 is a diagrammatic illustration of an example computer system 100, consistent with embodiments of the present disclosure. In certain embodiments, the computer system 100 can include one or more remote devices 102 and one or more host devices 126. In embodiments, the host device 126 may be a DASD. Although two remote devices 102-1, 102-2 are shown in FIG. 1 for purposes of illustration, it is to be understood that one or more than two remote devices can be included in other embodiments. In embodiments, the applications which are submitting write requests to the DASD host device 126 may be hosted on the remote devices 102. Remote devices 102 and host device 126 may be located separately from each other and communicate over a network 150 in which the host device 126 comprises a central hub from which remote devices 102 can establish a communication connection. Alternatively, the host device and remote devices may be configured in any other suitable relationship (e.g., in a peer-to-peer or other relationship).

In certain embodiments the network 150 can be implemented using any number of any suitable communications topologies (e.g., wide area network (WAN), local area network (LAN), Internet, Intranet, hardwire, wireless link, etc.). The write requests from the applications on the remote devices 102 may be transmitted to the DASD host device 126 over the network 150. In certain embodiments, the network 150 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

In certain embodiments, the host device 126 can include an overlay management function 134 included in the system memory 132. In certain embodiments, the overlay management function 134 may be configured to track data overlay for certain volumes of the host device 126 and prevent some data overlay for certain volumes of the host device 126. The overlay management function 134 may also be configured to perform other tasks for managing overlay in a DASD. Other configurations and uses of the overlay management function 134 are also possible.

Consistent with various embodiments, each of host device 126 and remote devices 102 is implemented as a computer system including a respective set of system components. In certain embodiments, one or more of host device 126 and remote devices 102 may be equipped with a respective display or monitor. In certain embodiments, each computer system may include at least one respective central processing unit 106, 130; respective system memories 108, 132; respective internal or external network interface or communications devices 104, 128 (e.g., modem, network cards, etc.); and/or respective optional input devices (e.g., a keyboard, mouse, or other input device), as well as commercially available and custom software (e.g., browser software, communications software, server software, natural language processing software, search engine and/or web crawling software, filter modules for filtering content based upon predefined criteria, etc.). In certain embodiments, host device 126 and remote devices 102 may each include a respective graphics processing unit 110, 136 and a respective storage volume 112, 138. In certain embodiments, resource utilization data may be collected from the system components described herein by the management application 134 to facilitate the management of batch processing jobs. Other system components and configurations of host device 126 and remote devices 102 are also possible.

Figure 2:
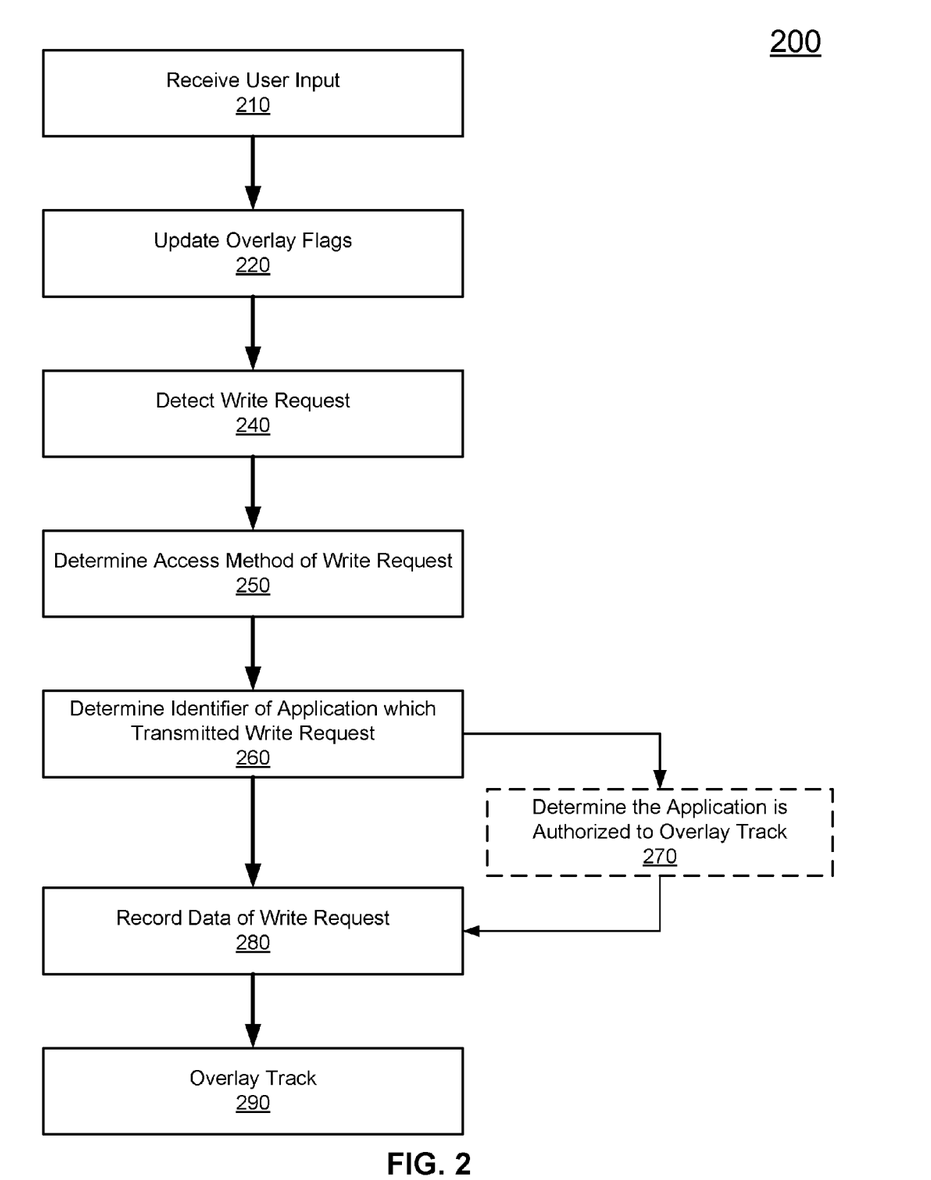
FIG. 2 is a method for managing overlay functionality, according to embodiments.

In certain embodiments, each of the computer systems may be implemented as one of a server, desktop, laptop, or hand-held devices. In addition, the overlay management function 134 may include one or more modules to perform the various functions of embodiments described herein, FIG. 2 is a flowchart illustrating a method 200 for managing data overlay in a DASD, consistent with embodiments of the present disclosure. In particular, the method 200 can be performed by a DASD, such as the DASD host device 126 discussed above. The visual arrangement of blocks in the flowchart of FIG. 2 is not to be construed as limiting the order in which the individual acts/operations may be performed, as certain embodiments may perform the operations of FIG. 2 in alternative orders. Blocks which are depicted with dashed lines are to be construed as optional operations.

At block 210 the DASD receives user input. The user may be a human or a computer system which manages the data on the DASD. The user input may be values which indicate that a physical record at a discrete physical location will have a certain type of overlay management. For example, the user input may include a value which specifies that a first track has activated overlay tracking. For another example, the user input may include a value which specifies that a second track has activated overlay prevention/interception. In embodiments, user input may specify types of overlay management on a track-by-track basis. In other embodiments, user input may specify types of overlay management on a larger scale (e.g., sector-by-sector or head-by-head).

At block 220 the DASD updates an overlay tracking flag. The overlay tracking flag may be a computer programming Boolean bit where one of the Boolean values indicates activated overlay tracking while the other Boolean value indicates inactivated overlay tracking. For example, in some embodiments, a value of "1" in the bit could indicate activated overlay tracking while a value of "0" could indicate inactivated overlay tracking. In certain embodiments, initialization functionality of the DASD could default all overlay tracking flags to inactivated values for performance benefits. The DASD may update the overlay tracking flag in response to receiving the user input. For example, the DASD may receive a user input which includes a message "OVRLY_TRACKING_FLAG,1" where the first portion of the message indicates the overlay tracking flag and the second flag indicates a new value of "1" (e.g., activated) to replace an existing value of "0" (e.g., inactivated). In response to receiving this message, the DASD may update "OVRLY_TRACKING_FLAG" to a value of "1", therein updating the overlay tracking flag and activating overlay tracking.

Once overlay tracking is activated, the OVRLY function may begin tracking data overlay. The OVRLY function may track data overlay for the discrete physical location of memory of the DASD specified by the user input. In embodiments, every discrete physical location which can individually store a datum (e.g., every track) may have a representative overlay tracking flag. In other embodiments, overlay tracking flags may represent sets of discrete physical locations which can store a plurality of datums (e.g., a distinct overlay tracking flag for different sectors or heads). In some embodiments, the DASD has different overlay tracking flags representative of different sizes of memory. For example, the DASD could have a first tracking flag which represents tracking data overlay for a single track, and a second tracking flag which represents tracking data overlay for two sectors.

Overlay tracking flags may be stored in the DASD with metadata on data of the DASD. In some embodiments, the metadata may be the volume table of contents (VTOC) of the DASD. In such embodiments, overlay data may be contained within an OVRLY table (OT) included in the VTOC.

At block 220 the DASD may update an overlay prevention flag. The overlay prevention flag may be a computer programming Boolean bit where one of the Boolean values indicates activated overlay prevention while the other Boolean value indicates inactivated overlay prevention. In embodiments, a value of "1" in the bit could indicate activated overlay prevention while a value of "0" could indicate inactivated overlay prevention. In certain embodiments, initialization functionality of the DASD could default all overlay prevention flags to inactivated values for performance benefits. The DASD may update the overlay prevention flag in response to receiving the user input, which may activation values for both overlay tracking and overlay prevention.

For example, the DASD may receive a user input which includes a message "OVRLY_TRACKING_FLAG,1 OVRLY_PREVENTION_FLAG,1" where the first half of the message indicates the overlay tracking flag with an accompanying value and the second half of the messages indicates the overlay prevention flag with an accompanying value. In this example, the value for the overlay prevention flag is "1" (e.g., activated) to replace a default value of "0" (e.g., inactivated). In response to receiving this message, the DASD may update both the overlay prevention and tracking flags to "1", therein updating both flags and activating both operations (e.g., overlay tracking and overlay prevention). In other embodiments, the user input may only include activation value for overlay prevention, whether because overlay tracking was activated from a previous user input or because overlay tracking has not yet been activated.

In some embodiments, the OVRLY function can only include overlay prevention/interception activation in conjunction with overlay tracking activation. Put differently, in some embodiments the DASD can only prevent data overlay after the DASD is tracking data overlay. In other embodiments as described herein, the OVRLY function may have the ability to prevent data overlay without tracking data overlay.

At block 240 the DASD detects a write request. The write request may be for a first track which stores a first datum. The write request may include a second datum to overlay the first datum. In some embodiments, overlaying data includes replacing a first set of data at a discrete physical location on a DASD with a second set of data at the same discrete physical location in such a way that no remnant of the first set of data remains at the discrete physical location. In some embodiments, upon receiving the write request, the DASD may reference the metadata of the VTOC to locate the first track on the DASD. While looking up the first track within the VTOC, the DASD may inspect the OVRLY table (OT). While inspecting the OT, the DASD may determine that overlay tracking has been activated for the first track. The DASD may also determine that overlay prevention has been activated for the first track.

At block 250, the DASD determines the access method of the write request. Different operating systems may use different access method for reading and writing data. An operating system may use different varieties of access method to send different varieties of data (e.g., one access method for sequential data sets and a different access method for virtually stored data sets). The DASD may determine the access method of the write request in response to determining that overlay tracking and/or overlay prevention has been activated for the first track. For example, the DASD may, in response to determining that the overlay tracking flag is activated for the track of the write request, determine that the write request was sent using an access method recognized by the DASD (e.g., basic direct access method, basic sequential access method, queued sequential access method, basic partitioned access method, indexed sequential access method, virtual storage access method, or object access method).

In embodiments, the DASD may use input/output services to determine the access method. The DASD may use input/output services to determine the access method because input/output services can distinguish the unique characteristics (e.g., unique formats or indirect addresses of incoming messages) of incoming write requests from applications due to the employment of different access methods. In some embodiments, input/output services of the DASD may have access to a data which details the unique means used by different access method. The DASD may therein determine an access method by using input/output functionality of the DASD to detect a message, analyze the format, and identify the format means as belonging to the access method. In some embodiments, the DASD may analyze the format to identify an indirect address of the write request, and reference the data within the save area conventions to determine the access method. In such embodiments, the input/output module may use internet protocol (IP) lookup commands (e.g., IP WHERE) to determine the indirect address and therein access method.

At block 260 the DASD determines an identifier of the application which sent the write request. For example, the DASD may use the determined access method from block 250 and an application table of indirect addresses (ATIA) to determine an identifier. The ATIA may be created by the input/output functionality. The ATIA may cross references access methods and indirect addresses against application identifiers. In this way a DASD may be able to reference the ATIA to quickly identify an application invoking an access method to submit a write request. In some embodiments, the input/output service may receive the identifiers of the applications from a network source which can trace the dataflow back to the application and receive the actual identifier, at which point the DASD could use the identifiers to initialize the ATIA. The identifier may be an address (e.g., a direct or return internet protocol (IP) address) of the application as used by the access method when transmitting the write request. The address may be distinct to the application which submitted the write request.

At block 270 the DASD may determine if the application is authorized to write to the track. The DASD may determine if the application is authorized to write to the track in embodiments where the overlay prevention/interception flag is activated. In such embodiments, the DASD may determine authorization of the application in response to determining that the overlay prevention/interception flag is activated. The DASD may use the OVRLY function to determine authorization. Authorization may be noted within the overlay table (OT). For example, a value in the OT may signal that an application has authorization to write to the track. In some embodiments, applications may default to being unauthorized to write to the track. In some such embodiments, applications may be individually authorized by a user.

The OVRLY function may determine authorization by comparing the identifier of the application to the identifiers within the OT. In embodiments, this may entail comparing the identifier of the application to a set of identifiers within the OT. The OVRLY function may match the identifier of the application to an identifier of the set of recognized applications. In some embodiments, the match may need to be an exact match between the two identifiers.

When the OVRLY function matches the identifier of the application to an identifier of the set of recognized applications, the OVRLY function may check to see if the OT marks the identifier as authorized. In embodiments, if the identifier of the application is not matched to any identifier within the OT, the OVRLY function may determine the application to be unauthorized. In other embodiments, all identifiers within the OT may be of authorized applications, so if the identifier of the application is matched the OVRLY function passes the write request; if the identifier is not matched, then the DASD does not pass the write request.

At block 280 the DASD records data of the write request. The DASD may use the OVRLY function to record the data. The OVRLY function may record the data by updating the information within the OT within the VTOC. When the track has been overlaid with new data, the OVRLY function may update the OT with the track, the identifier of the application, the original datum of the track, and/or the datum of the write request. In other embodiments, more information is included in the update, such as an overlay event number. For example, after a first overlay event for track 0001 0001 from application HELLOPGM with new datum "Hello World" to overlay an existing null value, the OT may include entry "0001 0001 HELLOPGM 'Hello World' ' '". If the track is overlaid again, the OVRLY function may expand the OT to include new fields for the track to represent the new overlay event. For example, if for track 0001 0001 a second application HIPGM with new datum "Hi World" overlays the datum "Hello World", the OT may include the two fields entries, "0001 0001 HELLOPGM 'Hello World' ' '" and entry "0001 0001 HIPGM 'Hi World' 'Hello World'".

The OVRLY function may expand the OT to add fields as necessary to record overlay events. Alternatively, the OVRLY function may overwrite previous OT entries to only maintain a set number of prior overlay events. In certain embodiments, the OVRLY function may overwrite previous overlay events from a first application only with new events from the same first application. In this way, a diversified number of overlaying applications can be recorded. For example, the OT may have a limit of 5 entries for a track. That track may be overlaid once by application A, then overlaid once by application B, then overlaid 6 times by application C. In an embodiment in which previous overlay events can be overwritten only by events from the same application, the OT may show one overlay by application A, one overlay by application B, and the three most recent overlays by application C. In embodiments in which the previous overlay events can be overwritten by events from any application, the OT would show the five most recent overlays by application C in the above example.

In some embodiments, the OT may have a ceiling of how many fields a track can expand before the OVRLY function begins recording overlay events over the least recent overlay event recorded within the OT. In certain embodiments, a user could change the maximum number of fields an OT could contain. In other embodiments, a user could change the maximum number of fields a certain track could contain, giving some tracks more available records and other tracks less available records (e.g., a user could record more overlay history for a track which contains more important data).

In embodiments, the OVRLY function may record the write request when the write request is intercepted. This may include recording the application which sent the write request, the current datum on the track, the datum of the write request which was intended to overwrite the current data, and the intercepted status of the write request. For example, if in the example above the second application HIPGM was not authorized to write to track 0001 0001, the OVRLY function may update the OT to include a new entry "0001 0001 HIPGM 'Hi World' 'Hello World' INTERCEPTED".

At block 290 the DASD overlays the track with the new datum of the write request. The DASD may overlay the track in response to recording the write request. In embodiments, the input/output service may be blocked from sending the data for overlay until the OVRLY function completes the OT update. Blocking data overlay until the OT update may result in data integrity benefits. When the overlay tracking flag is not activated, the DASD may overlay the data in response to recording the write request. When the OVRLY prevention flag is activated, the DASD may overlay the track in response to both recording the write request and determining that the application is authorized as described herein. Alternatively, when the overlay prevention flag is activated and the application is unauthorized, the OVRLY function may intercept the write request. By intercepting the write request, the OVRLY function may block the write request from overlaying the current datum on the track with the new datum on the write request.

Figure 3:
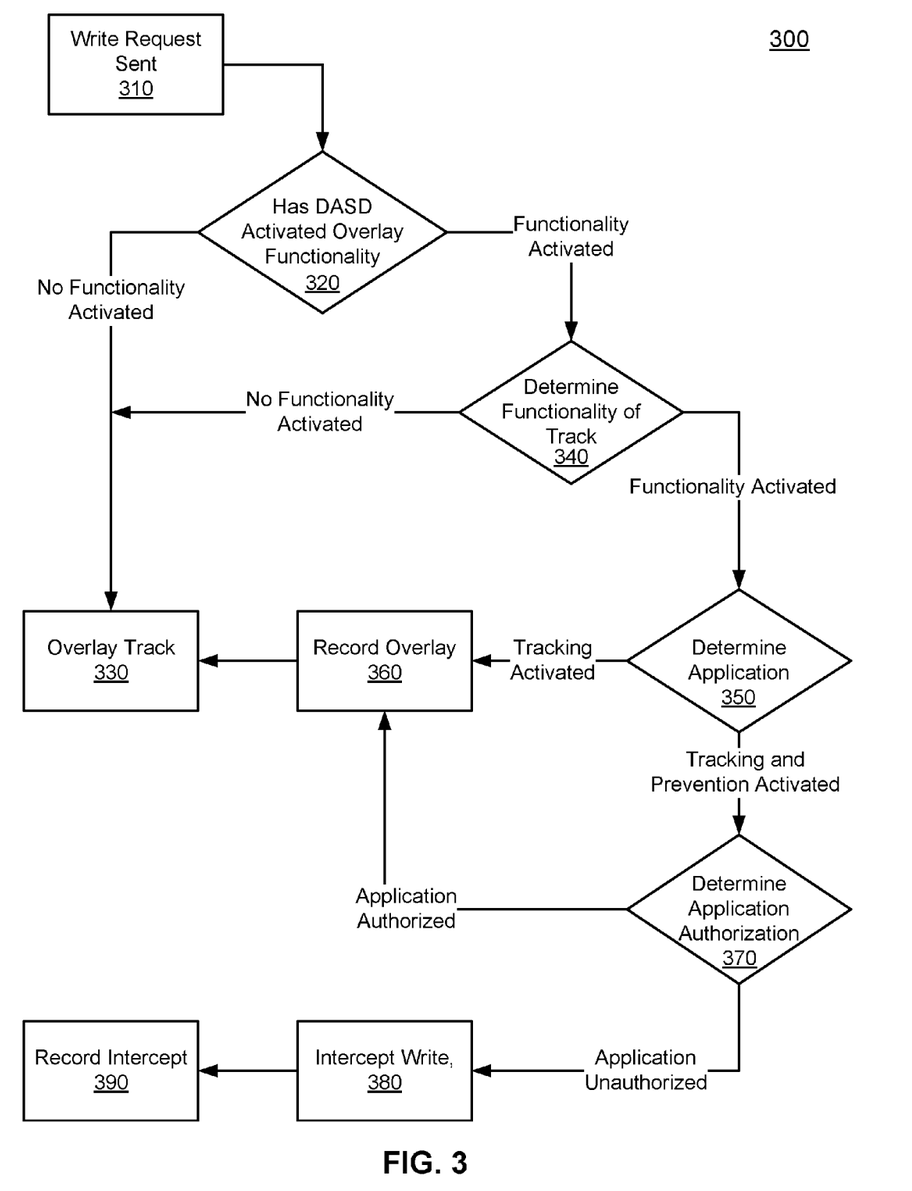
FIG. 3 is a flowchart for managing overlay functionality, according to embodiments.

FIG. 3 is a flowchart illustrating a method 300 for managing data overlay in a DASD, consistent with embodiments of the present disclosure. At block 310 a write request is sent to overlay data from an application to a DASD device. In embodiments, the DASD device may not be utilizing the OVRLY function. If the DASD has not yet activated the OVRLY function, at block 320 the DASD will send the write request to overlay the track at block 330. Alternatively, if the DASD has activated the DASD function for overlay tracking, the DASD will check the overlay table (OT) to see what overlay flags are activated for the track of the write request. For example, the write request overlay existing data for track 0001 0001. The DASD may check the OT for track 0001 0001 at block 340 and find that no overlay flag (e.g., overlay tracking flag or overlay prevention flag) is checked for that track. In response to determining that no overlay functionality is activated for track 0001 0001, the DASD will overlay track 0001 0001 with the write request at block 330, even though other tracks of the DASD may have overlay management.

In another instance of the flowchart, the write request may be for a track 0001 0002. The write request may be from an application "COUNTERAPP" which is trying to change the track 0001 0002 from datum "1" to datum "2" using the basic sequential access method (BSAM). At block 340 the DASD may check the OT and determine that track 0001 0002 is activated for tracking and not overlay prevention. In response to determining that track 0001 0002 is activated for tracking, the DASD may analyze the write request as it was received by the DASD input/output modules to determine the application which sent the write request at block 350. In embodiments, this may include using the format of the write request to determining the access method used to transmit the write request was BSAM, and—using a master list—cross check BSAM and the indirect address of the write request to find an identifier (COUNTERAPP) for the application. Once determined, at block 360 the OVRLY function may create a new entry in the OT of "0001 0002 COUNTERAPP '1' '2'". In response to the OT update, the DASD may overlay the datum of "1" on track 0001 0002 to datum "2".

At this point the DASD may receive user input which activates the tracking prevention flag for track 0001 0002 and authorizes COUNTERAPP as the only application authorized to overlay track 0001 0002. The DASD may update the OT to reflect this activation and authorization. After the OT update, the COUNTERAPP application may send a write request at block 310 for track 0001 0002 from datum "2" to datum "3". The input/output service of the DASD may find that overlay functionality has been activated for the DASD at block 320 and that both tracking and prevention have been activated for track 0001 0002 at block 340. The DASD may then analyze the write request as it was received by the DASD input/output to determine the transmitting application to be COUNTERAPP as described herein at block 350. The OVRLY function may then determine that COUNTERAPP is authorized at block 370. The OVRLY function may determine authorization by comparing COUNTERAPP to the applications stored as authorized within the OT. Here, the OVRLY function may match the COUNTERAPP to the authorized list, resulting in the OVRLY function determining COUNTERAPP to be authorized. The OVRLY function may create a new entry in the OT of "0001 0002 COUNTERAPP '2' '3'" at block 360. In response to the new entry in the OT, the DASD may overlay the datum of "2" on track 0001 0002 to datum "3" at block 330.

A different application COUNTERFEITAPP may send a write request at block 310 for track 0001 0002 which changes current datum "3" to datum "1" using the queued sequential access method (QSAM). The DASD may determine that overlay functionality is activated for the DASD at block 320 and that both tracking and prevention flags are activated for track 0001 0002 at block 340. The DASD may then analyze the write request to determine the transmitting application to be COUNTERFEITAPP as described herein at block 350. The OVRLY function may then determine that COUNTERFEITAPP is unauthorized at block 370. The COUNTERFEITAPP application may be found to be unauthorized in response to the OVRLY function not locating a corresponding application identifier within the OT. In response to determining that COUNTERFEITAPP is unauthorized to overlay track 0001 0002, the DASD may intercept the write request at block 380. In embodiments, intercepting the write request may include blocking the input/output functionality of the DASD from processing the write request. The OVRLY function may then record the intercept at block 390 as a new entry in the OT of "0001 0002 COUNTERFEITAPP '3' '1' INTERCEPTED" The specific values used in the illustrative embodiments of FIG. 3, such as example access methods, application identifiers, and datums, are provided for purposes of explanation only and are not intended to be limiting.

In some embodiments, the DASD may be programmed to process method 200 and flow chart 300 using z/OS. Additionally, in some embodiments, the DASD may employ extended addressing space (EAS) CCCCcccH track addresses. For example, in a z/OS DASD a new initialization option called common VTOC access facility (CVAF) (e.g., macros that enable programs to access data in the VTOC) OVRLY(YES|NO) may be created to enable processing method 200 and the decision tree from flow chart 300 following initialization. CVAF OVRLY(YES|NO) may be equivalent to the overlay tracking flag as described herein. The initialization process may construct an OT contained within the VTOC. In some embodiments, each OT may hold variables, the variables including: a track address (e.g., a CCHH track address) to identify the position of a track and quickly index OT entries; an overlay prevention bit (OPB) used to prevent an overlay (e.g., the overlay prevention/interception flag); an overlay event number (OEN) used to distinguish between overlay events so that the OVRLY function may determine which fields to update; a first overlay event field (OVERLY1) used to keep a record of the previous datum (e.g., 16 bytes of overlay data), the overlay job name (OJN) for this previous datum (e.g., job 1 or job 2), and an overlay load module (OLM) to identify the originating application (e.g., an application identifier); or a second overlay event field used to keep a record of the current datum (e.g., 16 bytes of overlay data), the OJN for the current datum, and the OLM of the originating application.

In some embodiments, a user can create more overlay event fields as needed to record more overlay events. Put differently, in the embodiment above the OVRLY function only keeps a record of the most recent overlay event, therein overwriting OVERLY1 (e.g., the previous overlay) in response to a new overlay event occurring. Alternatively, a user could expand the number of overlay event fields to keep a record of a greater number of overlay events. In some embodiments, a user could change the default number of event fields for all entries in the OT (e.g., bring overlay event fields from 2 to 4 for all tracks with overlay protection). The user could be a human user or an administrative program. In other embodiments, a user could change the number of event fields for a select number of entries in the OT, leaving other entries at a default value. For example, in one illustrative example, a user could leave 90 entries at a default of 2 overlay event fields and expand 10 entries to include 5 overlay event fields. It is to be understood that the values in the illustrative examples are provided for purposes of explanation only and are not to be considered limiting.

At initialization, the OT may be updated to prevent most write operations for the OT, Volume Label, VTOC, and VTOC sorting/viewing/locating functionality (e.g., VTOCIX) In some embodiments, only certain modules associated with initialization functionality and the common VTOC access facility (CVAF) may be allowed to write to these areas. During processing, the new CVAF OVRLY bit (e.g., the overlay tracking flag) will be marked in the DASD so that the input/output functionality of the DASD (I/O services) can identify that the track was initialized with overlay functionality.

In some embodiments, I/O services may be altered with a new flag (IOS PARMLIB CVAFOVRLY (YES|NO)) which can branch I/O processing to implement aspects of method 200. The default may be NO for all tracks, which may increase overall system I/O activity by avoiding unnecessary processing. Additionally, in some embodiments, the flag may only be available for systems with DASD volumes initialized with overlay functionality. I/O services development may use the documented conventions (e.g., IBM save area conventions) to determine the invoking access method (e.g., basic direct access method (BDAM), basic sequential access method (BSAM), queued sequential access method (QSAM), basic partitioned access method (BPAM), indexed sequential access method (ISAM), virtual storage access method (VSAM), object access method (OAM), or media manager), in some embodiments. The documented conventions may enable I/O services to create a new application table of indirect addresses (ATIA) used to later quickly identify applications invoking access methods.

In some embodiments, if overlay functionality is activated (e.g., DASD is set to IOS PARMLIB CVAFOVRLY(YES) and unit control block CVAF OVRLY bit is ON) then I/O services may execute the new processing. I/O services may first call the OVRLY function before executing a write operation channel command word (CCW). I/O services may provide both the CCW and the application's return address extracted from the ATIA. For example, I/O services may analyze the format of a write request by issuing a querying (e.g., IP WHERE) R13?+C, where R13 refers to a register which holds the program state and offset+C refers to a register which contains the return address. The direct address located here may be the first level caller. The query may return BSAM as the access method, for example. Now that I/O services knows that the application used BSAM, the ATIA may be used to find the application's return address, as discussed above. I/O services may pass the direct address found along with the CCW to the OVRLY function to record in the OT.

Modifying I/O services in this way may ensure that the OVRLY function is invoked for DASD volumes initialized with overlay functionality during write operations regardless of which access method is used by an application. After identifying the application identifier (e.g., application load module), the OVRLY function may either update the OT involved or prevent the application from overlaying data on the tracks.

For example (shown in string format rather than hexadecimal format for clarity), tracks 0001 0001 and 0001 0002 may have OT entries "CCHH 0001 0001 OPB OFF OEN 01 OVERLY1 no_job no_module no_data OVERLY2 no_job no_module no_data" and "CCHH 0001 0002 OPB OFF OEN 01 OVERLY1 no_job no_module no_data OVERLY2 no_job no_module no_data", respectively. Application HELLOPGM may open a dataset and use BSAM to write "Hello World" to these tracks. BSAM may call I/O services with a write CCW for track CCHH 0001 0001 with the datum "Hello" and track CCHH 0001 0002 with the datum "World". After the DASD detects that overlay tracking functionality is activated (e.g., DASD is set to IOS PARMLIB CVAFOVRLY(YES) and unit control block CVAF OVRLY bit is ON) but overlay prevention is not activated (e.g., the overlay prevention bit is set to "off" for all OT entries involved with the CCW), I/O services may call the OVRLY function with the same write CCW and the direct address for the application, which is identified as application load module HELLOPGM+150. At this point, the OT may hold entries "CCHH 0001 0001 OPB OFF OEN 02 OVERLY1 JOB1 HELLOPGM+150 'Hello' OVERLY2 no_job no_module no_data" and "CCHH 0001 0002 OPB OFF OEN 02 OVERLY1 JOB1 HELLOPGM+150 'World' OVERLY2 no_job no_module no_data". In response to recording the event, I/O services may overlay the data.

Continuing with this illustrative example, HELLOPGM re-opens the dataset to overlay the previously written data, again calling BSAM to write out "Hello2 World2" as described above. I/O services may again call the OVRLY function with the new write CCW and the direct address for the application, which now is identified as application load module HELLOPGM+250 due to the identification process. The OVRLY function may update the OT to hold entries "CCHH 0001 0001 OPB OFF OEN 01 OVERLY1 JOB1 HELLOPGM+150 'Hello' OVERLY2 JOB2 HELLOPGM+250 'Hello2'" and "CCHH 0001 0002 OPB OFF OEN 01 OVERLY1 JOB1 HELLOPGM+150 'World' OVERLY2 JOB2 HELLOPGM+250 'World2'". In response to updating the OT, I/O services may again overlay the data. At this point the tracks have the data "Hello2 World2" and the residual information in the OVERLY table can inform a user where this data came from and what was there before.

In some embodiments, when the overlay prevention is activated (e.g., OPB is set to "ON" for some of the OVRLY Table entries and at least one of the overlay event fields), in order for a OT entry with OPB "ON" to pass, the application identifier (e.g., overlay load module) must be the same identifier involved in the previous write operation. Additionally, in some embodiments, the updates for activating overlay prevention may be recorded differently. Specifically, the overlay event number may not be used, but instead the overlay event field (OVERLY1/OVERLY2) which has the matching identifier may be updated.

For example, programs HELLOPGM and PGM2 may have previously written "Hola" and "Hey" for OVERLY1 and OVERLY2 to track 0001 0002, respectively. If overlay tracking is activated and HELLOPGM sends "Hello World" as described above, the OT may be updated to include "CCHH 0001 0001 OPB OFF OEN 02 OVERLY1 JOB1 HELLOPGM+150 'Hello' OVERLY2 no_job no_module no_data" and "CCHH 0001 0002 OPB ON OEN 00 OVERLY1 JOB1 HELLOPGM+150 'World'' OVERLY2 JOBRDM2 PGM2+93 "Hey"". If HELLOPGM sends "Hello2 World2 as described above, the OT may again be updated to include "CCHH 0001 0001 OPB OFF OEN 01 OVERLY1 JOB1 HELLOPGM+150 'Hello' OVERLY2 JOB2 HELLOPGM+250 'Hello2'" and "CCHH 0001 0002 OPB ON OEN 00 OVERLY1 JOB2 HELLOPGM+250 'World2' JOBRDM2 OVERLY2 PGM2+93 'Hey'". In this way, the DASD may record a larger number of applications updating data on a smaller number of fields. Put differently, even though application HELLOPGM updated numerous times while application PGM2 updated only once, information on the most recent update of both is maintained. The OT may be expanded to record more applications.

In some embodiments, when overlay prevention is activated (e.g., the overlay prevention bit is set to "ON") by a user using multiple virtual storage (MVS) commands the DASD may intercept a write message before the CCW is processed on the track. For example, applications PGM2 and PGM3 may be authorized to write to tracks 0001 0001 and 0001 0002. Since HELLOPGM does not match PGM2 or PGM3, the DASD will not allow HELLOPGM to write either "Hello World" or "Hello2 World2" to tracks 0001 0001 and 0001 0002. In embodiments, the OVRLY function may issue an error message, create a system dump, and issue a return code to I/O services to prevent the write operation. It should be noted that during end of volume activity direct access device space management (DASDM) may manage space on the DASD by using operations (e.g., CREATE or EXTEND) to create new extents, in some embodiments. For example, when overlay prevention is activated, DADSM CREATE and EXTEND may be modified to call the OVRLY function to update the OT entries for these new extents so that the new extents have the same authorized applications as the last track that experienced end of data. When DADSM uses operations to delete extents (e.g., SCRATCH) the OVRLY function may be called to reset OT entries to a default value of no overlay prevention.

In some embodiments, a user may be able to use multiple virtual storage (MVS) to perform numerous operations on the OT. These operations may include, but are not limited to, adjusting the count of an overlay event number, display an OT entry for a requested track, setting an OT entry overlay prevention status, setting an overlay event number, or setting the applications which are authorized to write to a requested CCHH. For these commands, the DASD may find allocated dataset extents (CCHHs) from the VTOC on all volumes that the dataset is on.

Figure 4:
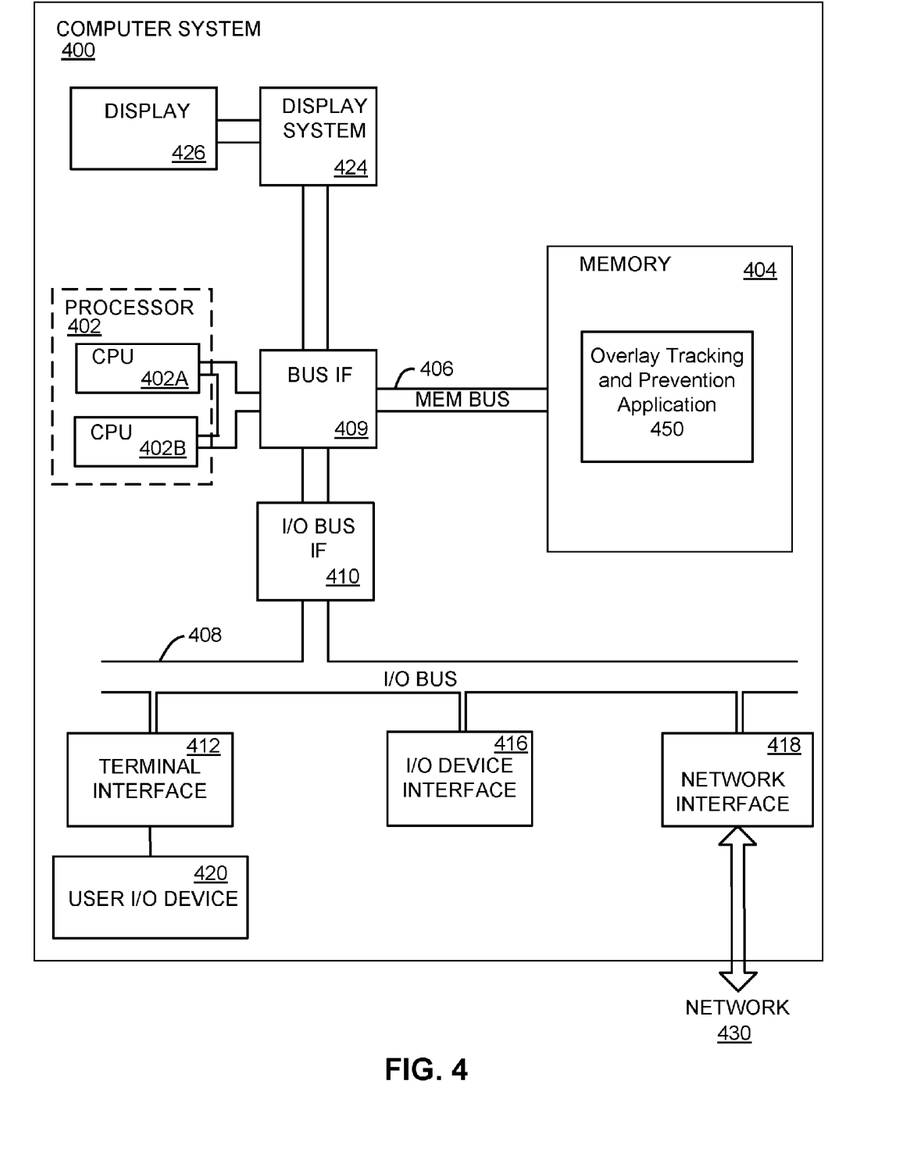
FIG. 4 is a system for managing overlay functionality, according to embodiments.

FIG. 4 depicts a high-level block diagram of a computer system 400 for implementing various embodiments. The components of the various embodiments disclosed herein apply equally to any appropriate computing system. The components of the example computer system 400 shown in FIG. 4 include one or more processors 402, a memory 404, a terminal interface 412, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions—such as Overlay Tracking and Prevention Application 450 to perform the acts described with respect to method 200—stored in the memory 404 and may include one or more levels of on-board cache.

In embodiments, the memory 404 may include a random-access semiconductor memory, storage device, or storage medium (either volatile or non-volatile) for storing or encoding data and programs. The memory 404 can include the tracks being overlaid as described herein. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can include a volume table of contents (VTOC), an overlay table (OT) within the VTOC, and/or the overlay tracking and prevention application 450. In this illustrative embodiment, the overlay tracking and prevention application 450 includes instructions or statements that execute on the processor 402 or instructions or statements that are interpreted by instructions or statements that execute on the processor 402 to carry out functions (e.g., the acts of method 200) as further described below. However, in other embodiments, the overlay tracking and prevention application 450 is implemented in hardware via semiconductor devices, chips, logical gates, circuits, circuit cards, and/or other physical hardware devices (e.g., ASIC of FPGA) in lieu of, or in addition to, a processor-based system. Additionally, in some embodiments, the overlay tracking and prevention application 450 may include data in addition to instructions or statements.

In this example, the computer system 400 includes a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

FIG. 4 depicts several example components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The functionality outlined in the discussions herein regarding FIG. 2, FIG. 3, FIG. 4, and FIG. 4 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing data overlay in a direct access storage device (DASD) using metadata of data stored within the volume table of contents (VTOC) of the DASD, the method comprising:

initializing the DASD, wherein initialization includes updating an overlay table (OT) of the VTOC to hold respective default values for respective overlay tracking flags for all tracks of the DASD, wherein the respective default values indicate that data overlay will not be tracked for respective tracks;

receiving user input comprising a value indicating activation for a overlay tracking flag for a track of the DASD;

updating, within the OT, the overlay tracking flag from the default value to the value indicating tracking activation;

detecting, by input/output (I/O) functionality of the DASD, a first write request for the track, wherein the first write request includes a second datum to replace a first datum of the track;

determining, by the I/O functionality using an application table of indirect address (ATIA), in response to the overlay tracking flag having the value indicating tracking activation, a first access method used to transmit the write request;

determining, by the DASD referencing a protocol of the first access method, a first identifier of a first application which transmitted the first write request, wherein the first identifier is not listed within the OT for a previous write request to the track;

recording, within a first entry for the track of the OT, the first datum, the second datum, and the first identifier for the first application;

detecting, by input/output (I/O) functionality of the DASD, a second write request for the track, wherein the second write request includes a third datum to replace the second datum of the track;

determining, by the I/O functionality using the ATIA, in response to the overlay tracking flag having the value indicating tracking activation, a second access method used to transmit the second write request;

determining, by the DASD referencing a protocol of the second access method, a second identifier of a second application which transmitted the second write request, wherein the second identifier is not listed within the OT for a previous write request to the track;

recording, within a second entry for the track of the OT, the second datum, the third datum, and the second identifier for the second application;

overlaying the second datum on the track with the third datum in response to recording the second datum, the third datum, and the second identifier for the second application;

detecting, by the input/output (I/O) functionality, a third write request for the track, wherein the third write request includes a fourth datum to replace the third datum of the track;

determining, by the I/O functionality using the ATIA, in response to the overlay tracking flag having the value indicating tracking activation, the first access method used to transmit the third write request;

determining, by the DASD referencing the protocol of the first access method, the first identifier of the first application which transmitted the third write request;

determining, by the DASD, that the first identifier of the first application matches an identifier of the first entry in the OT;

overwriting, within the OT in the first entry in response to determining that the first identifier matches the first entry, the first datum with the third datum and the second datum with the fourth datum; and overlaying the third datum on the track with the fourth datum in response to recording the third datum and the fourth datum in the first entry within the OT for the first identifier for the first application.

\* \* \* \* \*